Oct. 13, 1931.  R. B. WOODCOCK  1,826,855
WORK PRESENTING DEVICE
Filed July 24, 1929
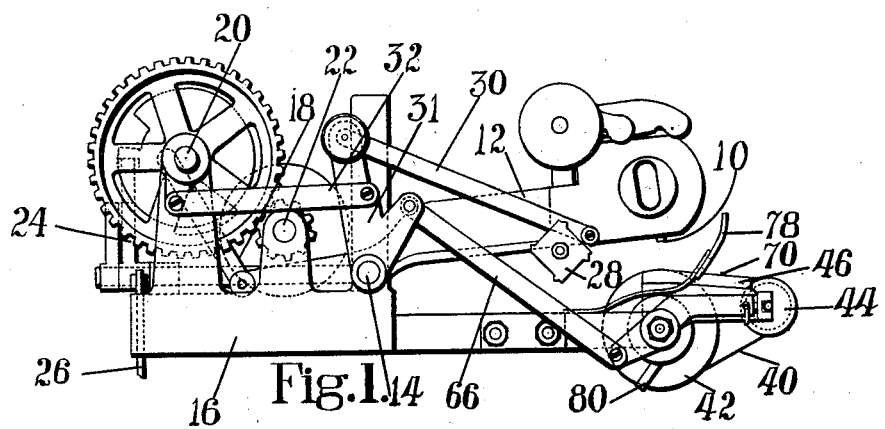
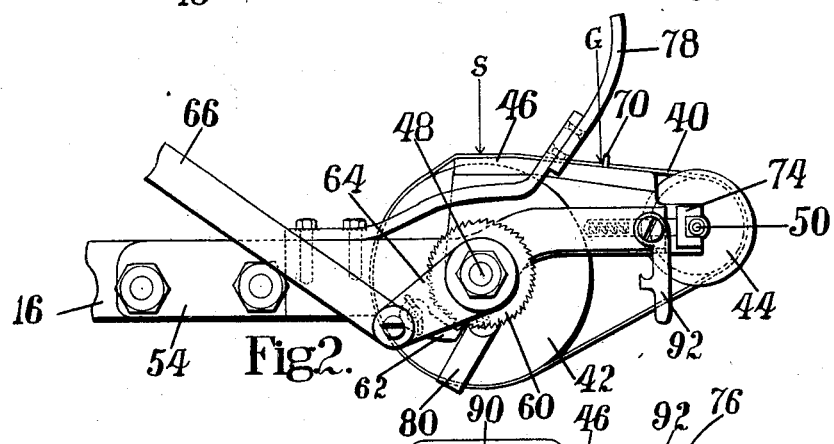
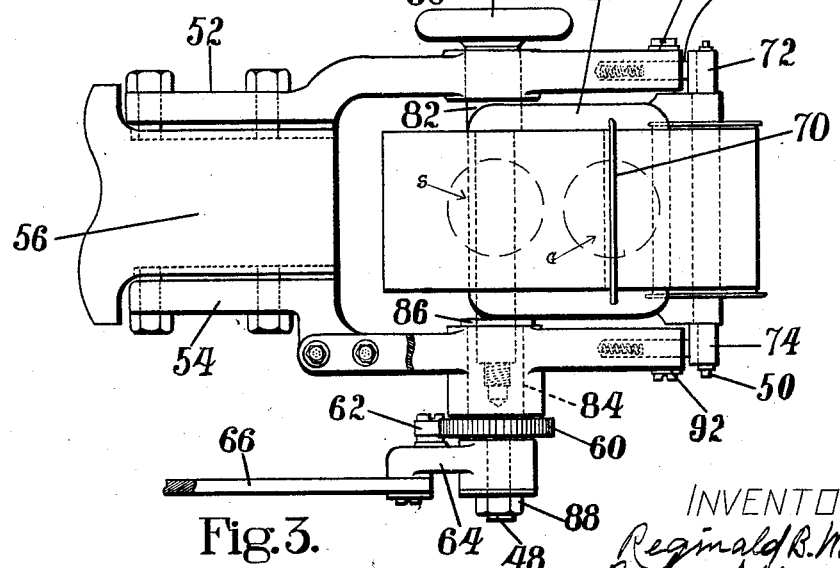
INVENTOR
Reginald B. Woodcock
By his Attorney,
Nelson W. Howard Patented Oct. 13, 1931

1,826,855

UNITED STATES PATENT OFFICE

REGINALD BOYD WOODCOCK, OF LEICESTER, ENGLAND, ASSIGNOR TO UNITED SHOE MACHINERY CORPORATION, OF PATERSON, NEW JERSEY, A CORPORATION OF NEW JERSEY

WORK PRESENTING DEVICE

Application filed July 24, 1929, Serial No. 380,706, and in Great Britain August 21, 1928.

This invention relates to work-presenting devices and is herein illustrated as embodied in a marking machine of the type shown in United States Letters Patent No. 1,451,709, granted April 17, 1923 upon the application of D. W. Morley, although it will be understood that the invention is not limited to machines of that type.

Marking machines designed for marking shoe uppers and the like usually embody a relatively fixed platen and an oscillating printing head by means of which marks or legends may be applied to pieces of work supported on the platen. When the pieces of work are of small size, difficulty is experienced in presenting successive pieces of work to the machine because of the danger to the operator's hands and various arrangements involving a rotating work carrier have been devised for carrying the pieces of work from a loading station to the operating station.

An object of the present invention is to provide an improved work-presenting device of simple construction and low cost by means of which small pieces of work may be presented successively to an operating position for the application of a tool without danger to the operator.

In accordance with a feature of the invention, my novel work-presenting device includes an endless work-supporting belt overlying a platen and constructed and arranged to carry pieces of work from a loading station to an operating station and then to discharge them.

In the illustrated machine and in accordance with features of the invention, this endless work-supporting belt is mounted on a pair of rollers, and arranged to overlie the platen of the machine. As illustrated, means are provided for intermittently advancing the belt and a gage member is located at the loading station overlying the belt to assist the operator in positioning a piece of work on the belt in such a fashion that the next advancing movement of the belt will carry the work to operating position where it will be marked and then carried on for discharge.

These and other features of the invention will be described in the following specification taken in connection with the accompanying drawings, in which Fig. 1 is a side elevation of a marking machine embodying the invention;

Fig. 2 is a similar enlarged view of the work-presenting mechanism; and

Fig. 3 is a plan view of the parts shown in Fig. 2.

A marking device 10 carried at the outer end of an oscillating lever 12 is pivoted at 14 on the frame 16 of the machine and is adapted to be oscillated by means of a link 18 connected to a crank shaft 20 which may be rotated by power supplied to the shaft 22 whenever the clutch 24 is released by operation of the treadle rod 26. In such machines the marking device 10 will commonly be provided with a series of type wheels and this marking device may be supplied with ink by mechanism such as that shown in Letters Patent of the United States No. 1,202,194, granted Oct. 24, 1916 upon the application of G. H. Lang, or else the mark to be applied may be effected by means of a strip of marking medium carried across the type faces by a feeding device 28 operated by a link 30 connected to a bell crank 31 pivoted on the shaft 14 and actuated in turn by means of a link 32 joined to a crank on the crank shaft 20. For a more complete description of such a mechanism reference may be had to Letters Patent of Great Britain No. 185,839, dated Sept. 11, 1922.

In order to support the pieces of work for the action of the marking device 10 and to carry successive pieces from a loading position out of the range of movement of such marking device to marking position, there is provided work-presenting mechanism shown more in detail in Figs. 2 and 3 which comprises an endless work-supporting belt 40 passing around a pair of rollers 42 and 44 and overlying a platen 46. The rollers 42 and 44 are mounted on spindles 48 and 50 carried by brackets 52 and 54 which are bolted to a reduced extension 56 of the frame 16.

The platen 46 is removably mounted at its forward end on the brackets 52 and 54 by extensions 47 of the platen 46 which loosely encircle the spindle 50. The extensions 49 extend vertically from the edges of the platen 46 and the lowermost portions of these extensions 49 embrace the spindle 48 to support the rear end of the platen. When it is desired to remove the tacky belt 40 for any reason, as will hereinafter be more fully described, the platen 46 may also be removed.

To provide for the intermittent movement of the belt 40 the spindle 48 is provided with a ratchet 60 and with a cooperating pawl 62 mounted on an arm 64 which is pivoted on a reduced extension of said spindle 48. The pawl is spring-held in engagement with the ratchet. The actuation of this arm 64 is effected by a link 66 connecting it to the bell crank 31 and the arrangement is so timed that the advancing movement of the belt 40 at each actuation of the ratchet mechanism continues through a distance of about two and one-half inches, or sufficiently to carry a piece of work from a loading or gaging position G underneath a gage 70 which overlies the belt 40 to an operating or stamping position S directly underneath the marking device 10.

It will be seen from an inspection of Fig. 2 that the platen 46 has a horizontal portion directly underneath the stamping position S and an inclined portion directly under the gaging position G. The forward end of the table 46 rests on the spindle 50 while the rear end has depending lugs at either side positioned each between an end of the large roller 42 and one of the brackets 52, 54. The spindle 48 of the large roller passes through these arms. It will be noted that, due to the upward curvature of the outer ends of the arms 52 and 54, the upper line of the work-supporting belt 40 is substantially level and the forward end of the platen lies close to and approximately level with the highest part of the periphery of the small roller 44. The gage 70 is a U-shaped piece of wire overlying the belt 40 with its ends inserted in the platen 46. Provision is made for tensioning the belt 40 by mounting the spindle 50 in notches in the ends of blocks 72 and 74, each of which has an inwardly projecting bearing pin 76 extending into a correspondingly shaped socket in the outer end of the corresponding bracket and a spring in each socket urges these blocks 72 and 74 outwardly to tension the belt.

It will be noted that a guard plate 78 bolted to one of the brackets 54 is arranged between the gaging position G and the stamping position S so that the operator will be unable to insert her fingers between the stamping device 10 and the platen 46 during the operation of the machine. Preferably, the surface of the belt is made tacky by coating it with rubber cement and it has been found that small pieces of work placed upon the belt will be carried along with the moving belt by reason of this tackiness and will retain their positions thereon unaltered during the operation of the machine and until they are subsequently removed. It has been found further that a belt made tacky by rubber cement will retain such tackiness for a considerable length of time and that pieces of work may be placed thereon and removed therefrom without fear that they will become soiled by contact with the belt. A stripper plate 80 is secured to the brackets 52 and 54 across the under side of the large roller 42 to remove pieces of work one by one in case they are held by the tackiness of the belt after they have been carried beyond the stamping position S.

In the operation of the machine, it is only necessary for the operator to set the type wheels to determine the imprint to be made by the marking device 10 to place a piece of work under the work gage 70 and to depress the starting treadle attached to the treadle rod 26. The machine will then operate to advance the belt to feed the piece of work forwardly over the table 46 to the stamping position S and will cause oscillation of the lever 12 to carry the marking device 10 into engagement with the work, while the latter is supported on the belt 40 backed up by the table 46. During the time that the belt is stationary the operator will position a piece of work on the belt with that particular part of the work which is to be marked directly underneath the work gage 70 and upon the next actuation of the machine this piece of work will be carried forward to the stamping position S because of the arrangement of the machine which drives the belt 40 forward a distance exactly equal to the distance between the gage 70 and the stamping position S, a distance of about two and one-half inches. This movement of the belt takes place after the marking device has engaged the work and started to rise so that there is no blurring of the impression and so that the piece of work placed by the operator upon the belt will be carried into position for impression on the next operation of the marking machine.

While the machine constructed and arranged as above described will be particularly useful when operating on very small pieces of work, it may be desired to use the machine to operate on large pieces of work such as vamps and quarters of shoe uppers. In such a case it may be desired to utilize the machine without the feeding belt 40 and to position the pieces of work upon the platen 46 by hand. For this reason, the construction of the machine is such that the belt can be quickly removed. Accordingly, the spindle 48 is made in two parts, the upper part 82 (as viewed in Fig. 3) being threaded into the lower part 84, which latter part is held in position in the bracket 54 by means of a flange 86 and a nut 88 outside the arm 64. The hand wheel 90 aids the operator in removing the part 82 of the spindle to allow the large roll 42 and its belt and the platen 46 to drop down between the arms 52 and 54 so that the belt 40 can be freed from the roller. At the same time the spindle 50 may be easily removed from the blocks 72 and 74. After the gage 70 has been lifted out of the platen 46, the belt may be removed from the two rolls, whereupon the rolls and the platen 46 can be replaced in the machine and hooks 92 pivoted on the ends of the bracket arms 52 and 54 may engage with the ends of the spindle 50 to hold the smaller roll 44 against the tension of the springs pressing against the bearing blocks 72 and 74. The machine is then in condition for the presentation of larger work pieces laid upon the platen 46 and presented manually one at a time for the operation of the marking device 10. Any intermittent rotation of the larger roller 42 will be of no consequence because the work is supported by the platen 46 and is out of contact with the roll.

Having thus described my invention, what I claim as new and desire to secure by Letters Patent of the United States is:

1. A device for presenting successive pieces of work to operating position between a platen and a marking tool which are relatively movable to mark the work, said device comprising a pair of rollers, the axis of one of which is substantially in line with the path of approach of the marking tool and the platen, an endless belt around said rollers to support the successive work pieces, and means for advancing said belt intermittently between the operations of the marking tool.

2. In a work-presenting device for a machine embodying a platen and an operating tool movable toward and away from the platen along a predetermined path, a roller supported directly in said path and furnishing a support for said platen with a portion of the platen surface directly in the path of movement of the operating tool, an endless belt for supporting work pieces, and means including said roller for moving said endless belt across the upper surface of the platen to carry small pieces of work into position for application of the operating tool.

3. In a work-presenting device for a machine embodying a platen and an operating tool movable along a determined path, said platen having a portion which is out of the path of movement of the operating tool and another portion which is in line with said path of movement, a gage associated with said platen adjacent to said first-mentioned portion, and an endless belt passing over said platen to carry pieces of work to operating position and to support them over and by the platen when in that position.

4. In a work-presenting device for a machine embodying an operating tool movable along a path toward and away from the work, a platen positioned partly in the path of movement of the operating tool, an endless belt movable over the surface of said platen, a gage overlying the surface of said belt out of the path of movement of the operating tool, and means for moving said belt between each operation of the operating tool a distance equal to the distance between the operating position and said gage.

5. A device for presenting successive pieces of work to operating position between a platen and an operating tool which are relatively movable to treat the work, said device comprising an endless work-supporting belt movable across the surface of the platen and provided with a tacky surface, and means for intermittently advancing the belt between operations of the marking device.

6. A device for presenting successive pieces of work to operating position between a platen and an operating tool which are relatively movable to treat the work, said device comprising an endless work-supporting belt movable across the surface of the platen and provided with a tacky surface, means for intermittently advancing the belt between operations of the tool, and a stripper for removing pieces of work after they have been carried beyond the operating position by said belt.

7. In a work-presenting device for a marking machine having a frame, a marking device movably mounted on the frame for movement toward and away from the work, a bracket supported on the frame, and a platen removably mounted in the bracket, said device comprising a pair of rolls removably mounted in said bracket, an endless work-supporting belt passing around said rolls and overlying said platen, and means for advancing said belt intermittently between operations of the marking device.

8. A device for presenting successive pieces of work to operating position between a platen and an operating tool which are relatively movable to treat the work, said device comprising means for intermittently advancing pieces of work from a gaging position to a position overlying said work-supporting platen, and a guard located in the path of feed of the work and interposed between the gaging position and the platen, said guard being constructed and arranged to permit passage of the work and to prevent passage of the fingers of the operator.

9. In a work-presenting device for a marking machine having a marking device movable toward and away from the work and a platen, said device comprising an endless work-supporting belt constructed and arranged to carry pieces of work from a loading position to a marking position, rolls mounted on spindles and supporting said belt, one of said rolls being supported substantially in line with the path of movement of the marking device and the other of said rolls being resiliently mounted to tension the belt, said platen underlying a portion of said belt and supported by the spindles of said rolls, and means for advancing said belt.

10. A device for presenting successive pieces of work to operative position, said device comprising a work-supporting carrier coated on its work-engaging surface with rubber cement in a tacky condition, said carrier being advanced to deliver small pieces of work to the operating position.

11. A device for presenting successive pieces of work to operative position between a platen and an operating tool which are relatively movable to treat the work, said device comprising an endless work-supporting belt for delivering small pieces of work to operative position, said belt being provided on its work-engaging surface with a coating of rubber cement in a tacky condition whereby the work will be advanced by the belt and prevented from moving relatively to the belt by reason of the tackiness produced by the rubber cement, said belt overlying the platen, and means for advancing said belt intermittently.

In testimony whereof I have signed my name to this specification.

REGINALD BOYD WOODCOCK.